(12) United States Patent
Palanki

(10) Patent No.: US 8,594,576 B2
(45) Date of Patent: Nov. 26, 2013

(54) SHORT-TERM INTERFERENCE MITIGATION IN AN ASYNCHRONOUS WIRELESS NETWORK

(75) Inventor: Ravi Palanki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 831 days.

(21) Appl. No.: 12/390,132

(22) Filed: Feb. 20, 2009

(65) Prior Publication Data

US 2009/0247084 A1 Oct. 1, 2009

Related U.S. Application Data

(60) Provisional application No. 61/076,366, filed on Jun. 27, 2008, provisional application No. 61/040,347, filed on Mar. 28, 2008, provisional application No. 61/040,481, filed on Mar. 28, 2008.

(51) Int. Cl.
*H04B 15/00* (2006.01)

(52) U.S. Cl.
USPC .......................................................... 455/63.1

(58) Field of Classification Search
USPC ...................... 455/63.1, 67.11, 509, 515, 522
See application file for complete search history.

(56) References Cited

U.S. PATENT DOCUMENTS

| | | | |
|---|---|---|---|
| 5,513,379 | A | 4/1996 | Benveniste et al. |
| 7,047,016 | B2 | 5/2006 | Walton et al. |
| 7,349,504 | B2 | 3/2008 | Li et al. |
| 2004/0106412 | A1 | 6/2004 | Laroia et al. |
| 2004/0176124 | A1 | 9/2004 | Gopalakrishnan et al. |

(Continued)

FOREIGN PATENT DOCUMENTS

| | | |
|---|---|---|
| CA | 2300067 A1 | 2/1999 |
| CN | 1510948 A | 7/2004 |

(Continued)

OTHER PUBLICATIONS

"3rd Generation Partnership Project; Technical Specification Group Radio Access Network; Evolved UTRA and UTRAN; Radio Access Architecture and Interfaces (Release 7)" 3GPP Draft; TR_R3018_V_100, 3rd Generation Partnership Project (3GPP), Mobile Competence Centre; 650, Route Des Lucioles; F-06921 Sophia-Antipolis Cedex; France, vol. RAN WG3, Oct. 12, 2007, XP050143278 paragraph [6.12.5.1]-paragraph [6.12.5.3.5] figures 6.12.5.3.5-1.

(Continued)

*Primary Examiner* — Khanh V Nguyen
(74) *Attorney, Agent, or Firm* — Dalei Dong

(57) ABSTRACT

Techniques for mitigating interference in an asynchronous wireless network are described. A terminal may desire to communicate with a serving base station and may observe high interference from other base stations. In an aspect, some frequency resources may be reserved for sending reduce interference requests and pilots to support interference mitigation. In one design, a first station (e.g., a terminal) may send a request to reduce interference to at least one interfering station on reserved control resources. The first station may receive a pilot sent by each interfering station on reserved pilot resources. The reserved resources may be associated with data resources. The first station may estimate received signal quality of the data resources based on the pilot(s). The first station may receive data sent on the data resources by a second station (e.g., a serving base station) after the interfering station(s) have reduced interference.

37 Claims, 10 Drawing Sheets

(56) References Cited

U.S. PATENT DOCUMENTS

| | | | |
|---|---|---|---|
| 2007/0060057 A1* | 3/2007 | Matsuo et al. | 455/63.1 |
| 2007/0070908 A1 | 3/2007 | Ghosh et al. | |
| 2007/0082619 A1* | 4/2007 | Zhang et al. | 455/69 |
| 2007/0105574 A1* | 5/2007 | Gupta et al. | 455/509 |
| 2007/0142067 A1 | 6/2007 | Cheng et al. | |
| 2007/0207828 A1* | 9/2007 | Cheng et al. | 455/522 |
| 2007/0223611 A1 | 9/2007 | Ode et al. | |
| 2007/0242765 A1 | 10/2007 | Parizhisky et al. | |
| 2008/0008147 A1* | 1/2008 | Nakayama | 370/338 |
| 2009/0203320 A1* | 8/2009 | Horn et al. | 455/63.1 |
| 2009/0247181 A1 | 10/2009 | Palanki et al. | |
| 2009/0325626 A1 | 12/2009 | Palanki et al. | |

FOREIGN PATENT DOCUMENTS

| | | |
|---|---|---|
| CN | 1551525 A | 12/2004 |
| CN | 1989775 A | 6/2007 |
| EP | 0901299 A2 | 3/1999 |
| EP | 1455549 A1 | 9/2004 |
| EP | 1850612 A1 | 10/2007 |
| JP | 2004214754 A | 7/2004 |
| JP | 2006287601 A | 10/2006 |
| JP | 2007529915 A | 10/2007 |
| JP | 2007533224 A | 11/2007 |
| JP | 2008017325 A | 1/2008 |
| KR | 20060129219 A | 12/2006 |
| KR | 20070120992 A | 12/2007 |
| RU | 2142669 C1 | 12/1999 |
| RU | 2288538 C2 | 11/2006 |
| WO | 9428623 A1 | 12/1994 |
| WO | WO9909667 A1 | 2/1999 |
| WO | 02093782 A1 | 11/2002 |
| WO | WO2005062798 A2 | 7/2005 |
| WO | 2005101882 A1 | 10/2005 |
| WO | WO2006105308 A2 | 10/2006 |
| WO | WO2007022631 | 3/2007 |
| WO | WO2007024895 | 3/2007 |
| WO | WO2007044281 | 4/2007 |
| WO | WO2008093100 | 8/2008 |
| WO | WO2009009549 | 1/2009 |
| WO | WO2009035983 | 3/2009 |
| WO | WO2009039404 | 3/2009 |
| WO | WO2009043002 | 4/2009 |
| WO | WO2009064699 | 5/2009 |

OTHER PUBLICATIONS

Ericsson et al: "Text Proposal for DC-HSDPA assumptions and standards impact" 3GPP Draft; R1-082249 Text Proposal for DC-HSDPA Assumptions and Standards Impact, 3rd Generation Partnership Project (3GPP), Mobile Competence Centre; 650, Route Des Lucioles; F-06921 Sophia-Antipolis Cedex; France, vol. RAN WGI, No. Kansas City, USA; 20080523, May 23, 2008, XP050110541, p. 8, paragraph 4.1-paragraph 4.2; p. 9, paragraph 4.3.1.

Huawei "Component carrier structures", 3GPP Draft; R1-090814, 3rd Generation Partnership Project (3GPP), Mobile Competence Centre ; 650, Route Des Lucioles ; F-06921 Sophia-Antipolis Cedex ; France, No. Athens, Greece; 20090203, Feb. 3, 2009, XP050318671 [retrieved on Feb. 3, 2009].

International Search Report & Written Opinion—PCT/US2009/036406, International Search Authority—European Patent Office—Nov. 26, 2009.

Nokia et al: "L1 control signaling with carrier aggregation in LTE-Advanced", 3GPP Draft; R1-083730, 3rd Generation Partnership Project (3GPP), Mobile Competence Centre ; 650, Route Des Lucioles ; F-06921 Sophia-Antipolis Cedex ; France, No. Prague, Czech Republic; 20080924, Sep. 24, 2008, XP050317069 [retrieved on Sep. 24, 2008].

Nokia Siemens Networks et al: "Primary Component Carrier Selection, Monitoring, and Recovery" 3GPP Draft; R1-090735_Primaryccselesct 3rd Generation Partnership Project (3GPP), Mobile Competence Centre; 650, Route Des Lucioles; F-06921 Sophia-Antipolis Cedex; France No. Athens, Greece; 20090203, Feb 3, 2009, XP050318599.

Nokia Siemens Networks et al: "Use of Background Interference Matrix for Autonomous Component Carrier Selection for y LTE-Advanced" 3GPP Draft; RI-090235, 3rd Generation Partnership Project (3GPP), Mobile Competence Centre; 650, Route Des Lucioles ; F-06921 Sophia-Antipolis Cedex; France, No. Ljubljana; 20090107, Jan. 7, 2009, XP050318164 [retrieved on Jan. 1, 2007] the whole document.

Samsung: "Flexible Fractional Frequency—Reuse Approach" Internet Citation Nov. 7, 2005, XP002387571 Retrieved from the Internet: URL:http://www.3gpp.org/ftp/tsg^ran/WGURL I/TSGR1_43/Docs/> [retrieved on Jun. 27, 2006 3H: the whole document.

Taiwan Search Report—TW098107421—Tipo—Nov. 26, 2012.

\* cited by examiner

SHORT-TERM INTERFERENCE MITIGATION IN AN ASYNCHRONOUS WIRELESS NETWORK

The present application claims priority to provisional U.S. Application Ser. No. 61/040,347, entitled "ASYNCHRONOUS LONG-TERM INTERFERENCE AVOIDANCE," filed Mar. 28, 2008, provisional U.S. Application Ser. No. 61/040,481, entitled "ASYNCHRONOUS SHORT-TERM INTERFERENCE AVOIDANCE," filed Mar. 28, 2008, and provisional U.S. Application Ser. No. 61/076,366, entitled "FLEXIBLE MULTICARRIER COMMUNICATION SYSTEM," filed Jun. 27, 2008, all assigned to the assignee hereof and incorporated herein by reference.

BACKGROUND

I. Field

The present disclosure relates generally to communication, and more specifically to techniques for mitigating interference in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A terminal may communicate with a base station via the downlink and uplink. The downlink (or forward link) refers to the communication link from the base station to the terminal, and the uplink (or reverse link) refers to the communication link from the terminal to the base station.

A base station may transmit data on the downlink to a terminal and/or may receive data on the uplink from the terminal. On the downlink, a transmission from the base station may observe interference due to transmissions from neighbor base stations. On the uplink, a transmission from the terminal may observe interference due to transmissions from other terminals communicating with the neighbor base stations. For both the downlink and uplink, the interference due to interfering base stations and interfering terminals may degrade performance.

There is therefore a need in the art for techniques to mitigate interference in a wireless network.

SUMMARY

Techniques for mitigating interference in a wireless communication network are described herein. A terminal may desire to communicate with a serving base station and may observe high interference from interfering base stations. The serving base station may also observe high interference from interfering terminals communicating with neighbor base stations. The terminal and the serving base station may be asynchronous with the interfering base stations and the interfering terminals.

In an aspect, some frequency resources may be reserved for sending reduce interference requests and may be referred to as reserved control resources. Some frequency resources may also be reserved for sending pilots and may be referred to as reserved pilot resources. The reserved control resources and the reserved pilot resources may be used to support interference mitigation in an asynchronous wireless network.

In one design, a first station (e.g., a terminal) may send a request to reduce interference to at least one interfering station (e.g., at least one interfering base station) on the reserved control resources. The first station may receive at least one pilot sent by the at least one interfering station on the reserved pilot resources. The request to reduce interference and the pilot may be sent as described below. The reserved control resources and the reserved pilot resources may be associated with data resources, which may comprise frequency resources that can be used to send data. The first station may estimate received signal quality of the data resources based on the at least one pilot and may send the estimated received signal quality to a second station (e.g., a serving base station). The first station may thereafter receive data sent on the data resources by the second station, after the at least one interfering station has reduced interference to the first station by reducing transmit power on the data resources. The second station may send the data at a rate determined based on the estimated received signal quality.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced are new releases of UMTS that use E-UTRA. UTRA, E-UTRA, UMTS, LTE, LTE-Advanced and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
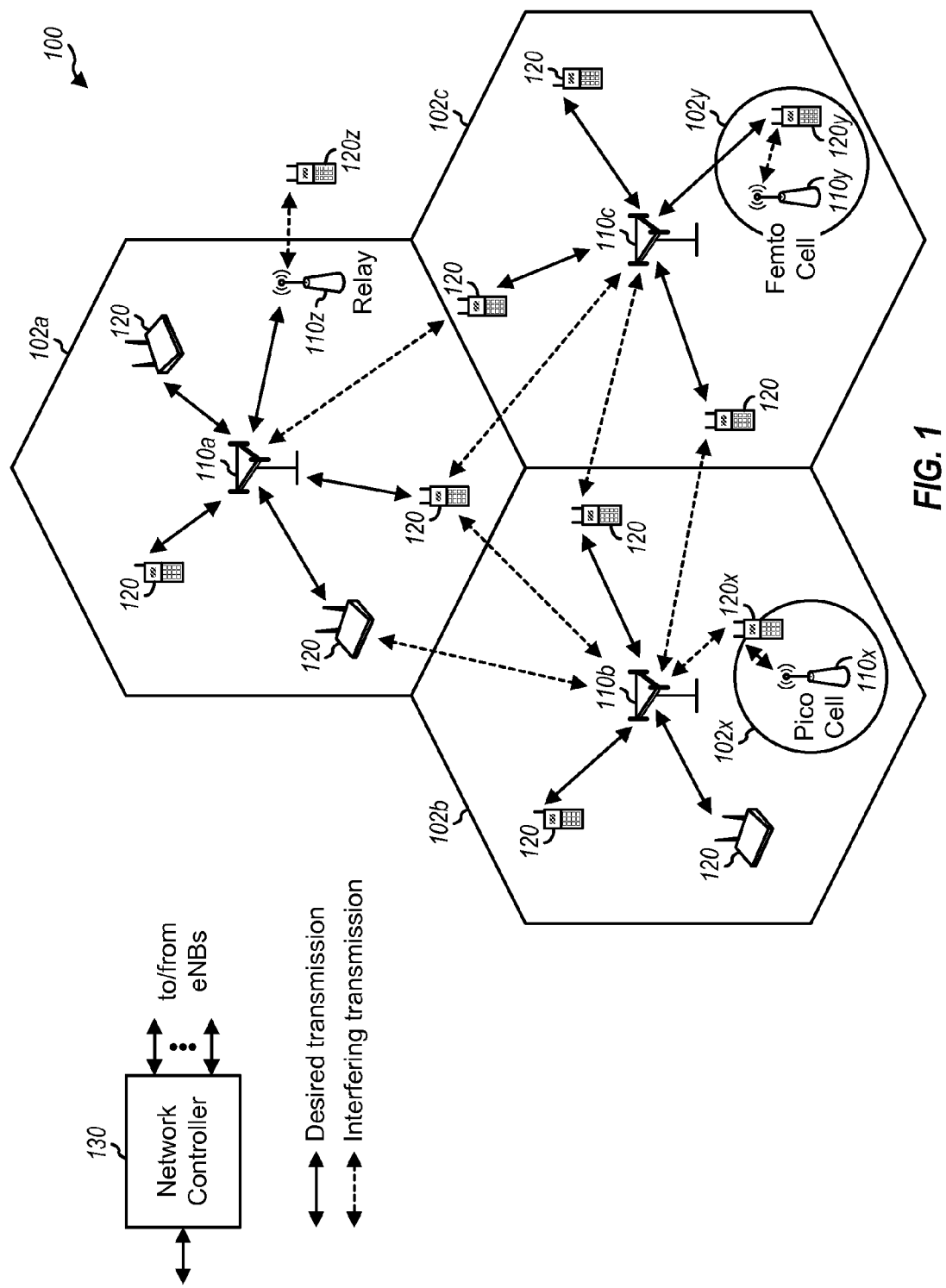
FIG. 1 shows a wireless communication network.

FIG. 1 shows a wireless communication network 100, which may include a number of base stations 110 and other network entities. A base station may be a station that communicates with the terminals and may also be referred to as an access point, a Node B, an evolved Node B (eNB), etc. Each base station 110 may provide communication coverage for a particular geographic area. The term "cell" can refer to a coverage area of a base station and/or a base station subsystem serving this coverage area, depending on the context in which the term is used.

A base station may provide communication coverage for a macro cell, a pico cell, a femto cell, etc. A macro cell may cover a relatively large geographic area (e.g., several kilometers in radius) and may allow unrestricted access by terminals with service subscription. A pico cell may cover a relatively small geographic area and may allow unrestricted access by terminals with service subscription. A femto cell may cover a relatively small geographic area (e.g., a home) and may allow restricted access by terminals having association with the femto cell, e.g., terminals belonging to a closed subscriber group (CSG). A base station for a macro cell may be referred to as a macro base station. A base station for a pico cell may be referred to as a pico base station. A base station for a femto cell may be referred to as a femto base station or a home base station.

In the example shown in FIG. 1, base stations 110a, 110b and 110c may be macro base stations for macro cells 102a, 102b and 102c, respectively. Base station 110x may be a pico base station for a pico cell 102x. Base station 110y may be a femto base station for a femto cell 102y. The pico and femto cells may be located within the macro cells (as shown in FIG. 1) or may overlap with macro cells.

Wireless network 100 may also include relay stations, e.g., a relay station 110z. A relay station is a station that receives a transmission of data and/or other information from an upstream station and sends a transmission of the data and/or other information to a downstream station.

A network controller 130 may couple to a set of base stations and provide coordination and control for these base stations. Network controller 130 may be a single network entity or a collection of network entities. Network controller 130 may communicate with base stations 110 via a backhaul. Base stations 110 may also communicate with one another, e.g., directly or indirectly via wireless or wireline backhaul.

Wireless network 100 may be a homogeneous network that includes only macro base stations. Wireless network 100 may also be a heterogeneous network that includes base stations of different types, e.g., macro base stations, pico base stations, home base stations, relays, etc. These different types of base stations may have different transmit power levels, different coverage areas, and different impact on interference in wireless network 100. For example, macro base stations may have a high transmit power level (e.g., 20 Watts) whereas pico and femto base stations may have a low transmit power level (e.g.,  1 Watt). The techniques described herein may be used for homogeneous and heterogeneous networks.

Terminals 120 may be dispersed throughout wireless network 100, and each terminal may be stationary or mobile. A terminal may also be referred to as an access terminal (AT), a mobile station (MS), a user equipment (UE), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may be able to communicate with macro base stations, pico base stations, femto base stations, relays, etc. In FIG. 1, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink. In the description herein, a station may be a base station, a terminal, or a relay.

Wireless network 100 may support synchronous or asynchronous operation. For synchronous operation, the base stations may have similar frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

Figure 2:
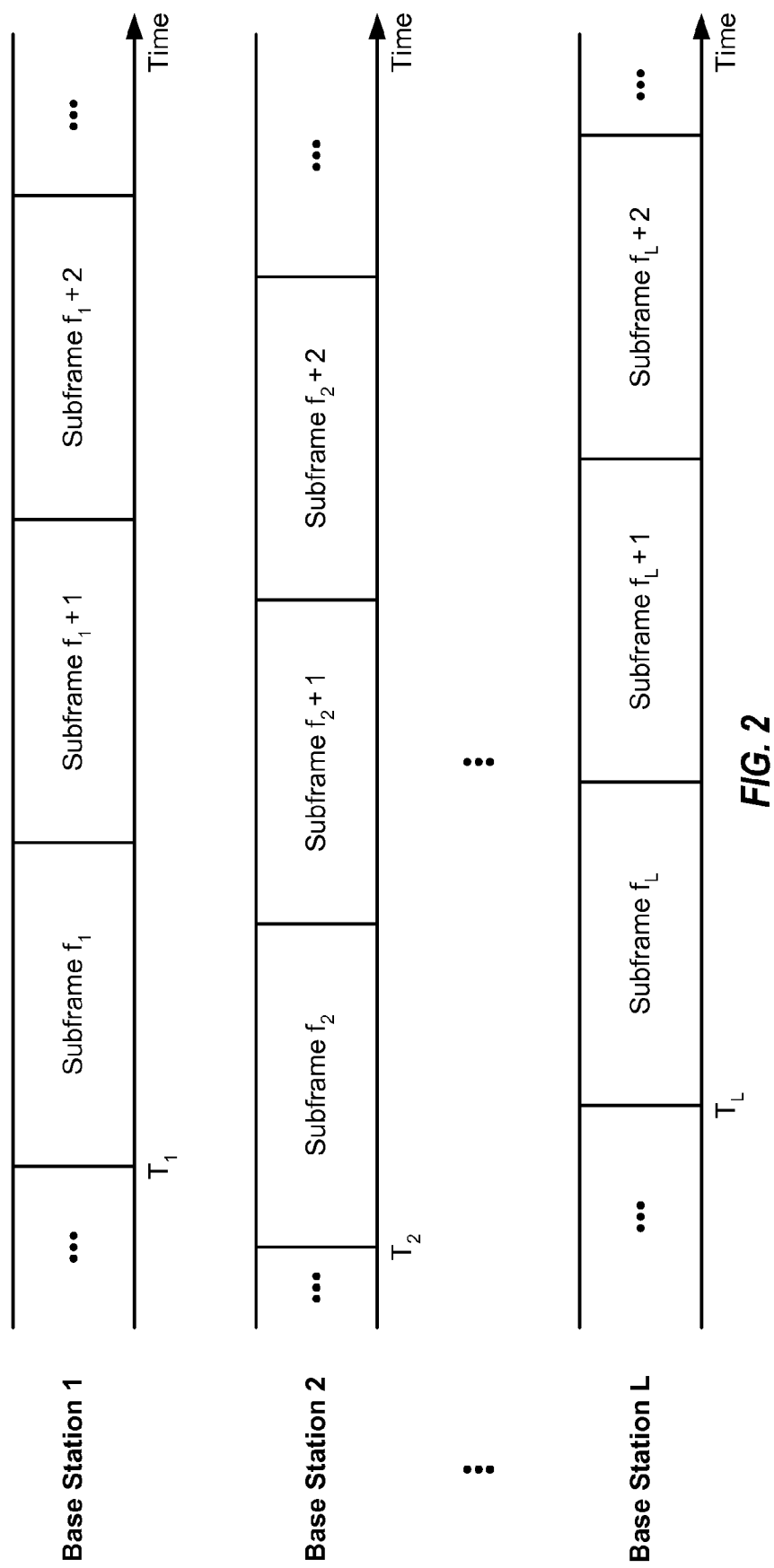
FIG. 2 shows asynchronous operation by multiple base stations.

FIG. 2 shows an example of asynchronous operation by multiple (L) base stations 1 through L. For each base station, the horizontal axis may represent time, and the vertical axis may represent frequency or transmit power. The transmission timeline for each base station may be partitioned into units of subframes. Each subframe may have a predetermined duration, e.g., 1 millisecond (ms). A subframe may also be referred to as a slot, a frame, etc.

For asynchronous operation, each base station may independently maintain its frame timing and may autonomously assign indices to subframes. For example, base station 1 may have subframe $f_1$ starting at time $T_1$, base station 2 may have subframe $f_2$ starting at time $T_2$, etc., and base station L may have subframe $f_L$ starting at time $T_L$. The start times $T_1$, $T_2$, ..., and $T_L$ may not be time aligned, as shown in FIG. 2. Furthermore, the subframe indices $f_1, f_2, ..., $ and $f_L$ may have different values.

Wireless network 100 may utilize frequency division duplexing (FDD). For FDD, one frequency channel may be allocated for the downlink, and another frequency channel may be allocated for the uplink. The frequency channel for each link may be considered as frequency resources that may be used for transmission on that link. The frequency resources for each link may be partitioned in various manners.

Figure 3:
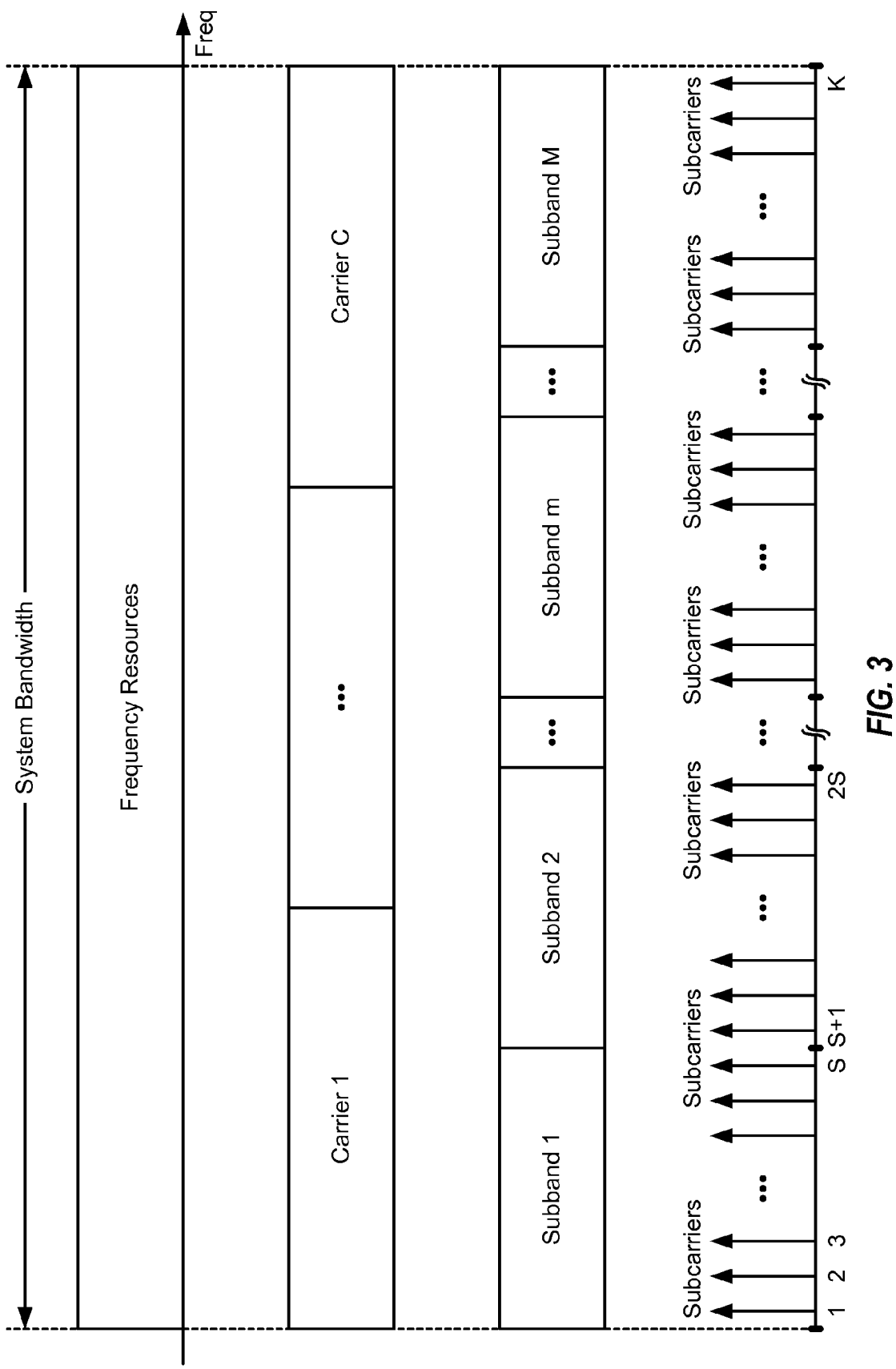
FIG. 3 shows exemplary partitioning of available frequency resources.

FIG. 3 shows a design of partitioning the available frequency resources for one link, e.g., the downlink or uplink. The system bandwidth for the link may be fixed or configurable. For example, LTE and UMB support system bandwidth of 1.25, 2.5, 5, 10 or 20 megahertz (MHz). The system bandwidth may be partitioned into M subbands with indices of 1 through M, where M may be any value. Each subband may cover a predetermined frequency range, e.g., 1.08 MHz in LTE. The number of subbands may be dependent on the system bandwidth and the subband size. For example, 1, 2, 4, 8 or 16 subbands may be available for system bandwidth of 1.25, 2.5, 5, 10 or 20 MHz, respectively.

The system bandwidth may also be partitioned into multiple (K) subcarriers with orthogonal frequency division multiplexing (OFDM) or single-carrier frequency division multiplexing (SC-FDM). The subcarriers may also be referred to as tones, bins, etc. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. Each subband may include S subcarriers, where S may be any value. For example, in LTE, each subband covers 1.08 MHz and includes 72 subcarriers.

The system bandwidth may also be partitioned into multiple (C) carriers. Each carrier may have a specific center frequency and a specific bandwidth. The number of carriers may be dependent on the system bandwidth and the carrier size.

In general, the available frequency resources for each link may be partitioned in various manners, with subbands, subcarriers, and carriers being three examples. The available frequency resources may be allocated and used for transmission.

A terminal may communicate with a serving base station in a dominant interference scenario. On the downlink, the terminal may observe high interference from one or more interfering base stations. On the uplink, the serving base station may observe high interference from one or more interfering terminals. A dominant interference scenario may be due to range extension, which is a scenario in which a terminal connects to a base station with lower pathloss and lower geometry among multiple base stations detected by the terminal. For example, terminal 120x in FIG. 1 may communicate with pico base station 110x with lower pathloss and lower geometry and may observe high interference from macro base station 110b. This may be desirable to reduce interference to the wireless network to achieve a given data rate for terminal 120x. A dominant interference scenario may also be due to restricted association, which is a scenario in which a terminal is unable to connect to a strong base station with restricted access and may then connect to a weaker base station with unrestricted access. For example, terminal 120y in FIG. 1 may be unable to connect to femto base station 110y, may connect to macro base station 110c, and may observe high interference from femto base station 110y. In a dominant interference scenario, a terminal may observe high interference from a strong base station on the downlink, and terminals served by the strong base station may cause high interference to a serving base station on the uplink.

Interference mitigation may be used to mitigate (e.g., to avoid or reduce) interference on a given link in order to improve performance of data transmission for a target station. For interference mitigation, an interfering station may blank or reduce its transmit power so that better received signal quality can be achieved for a desired transmission for the target station. Received signal quality may be quantified by signal-to-noise-and-interference ratio (SINR) or some other metric. The interfering station may also beamsteer its transmission away from the target station so that a higher SINR can be achieved.

Figure 4:
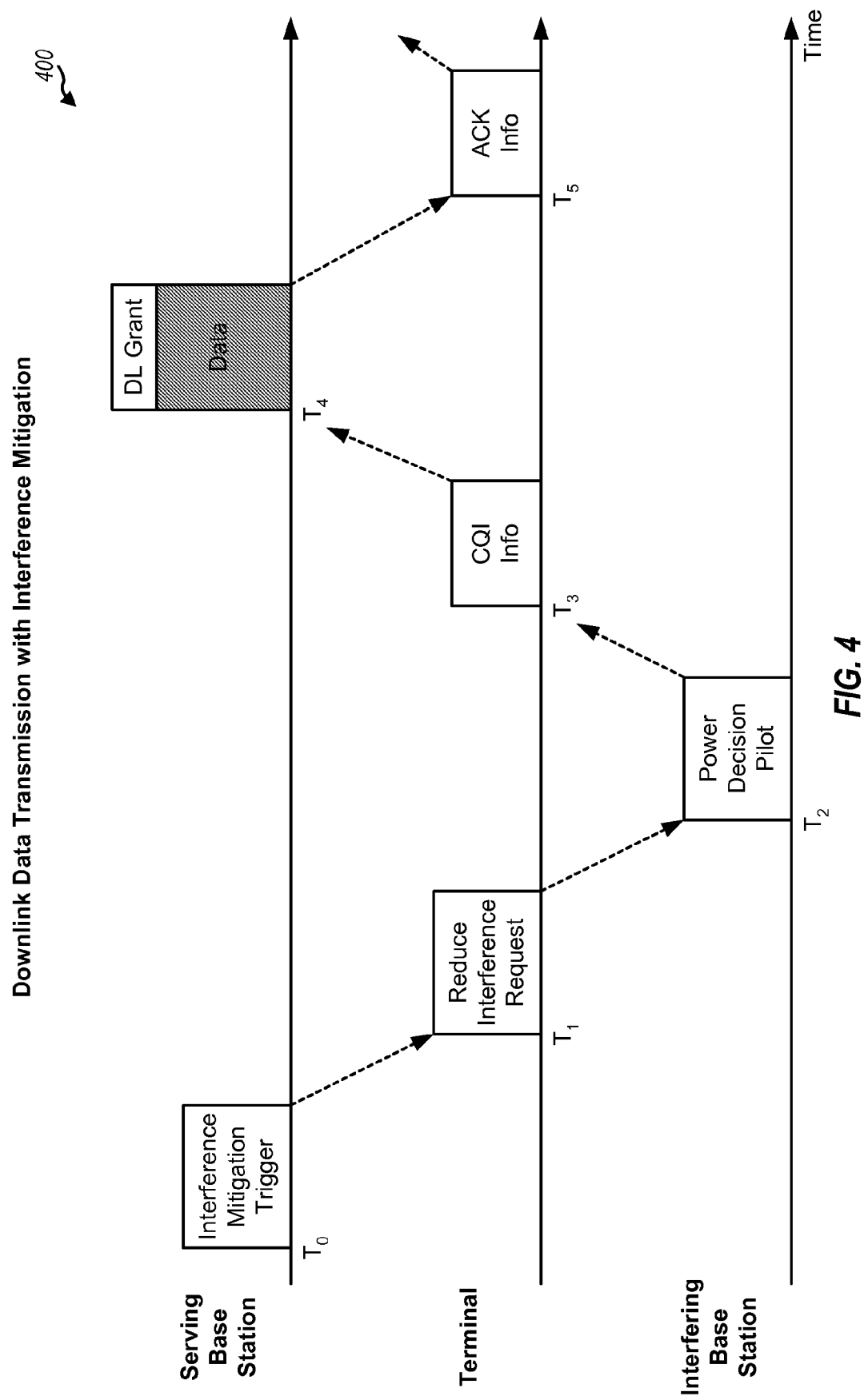
FIG. 4 shows downlink data transmission with interference mitigation.

FIG. 4 shows a design of a downlink data transmission scheme 400 with interference mitigation. A serving base station may have data to send to a terminal and may have knowledge that the terminal is observing high interference on the downlink. For example, the serving base station may receive pilot measurement reports from the terminal, and the reports may indicate and/or identify strong interfering base stations. The serving base station may send an interference mitigation trigger to the terminal at time $T_0$. This trigger may invoke the terminal to request interfering base stations to reduce interference on the downlink and may (explicitly or implicitly) convey specific resources on which to reduce interference, a priority of the request, and/or other information. The priority of the request may be determined based on the type of data to send (e.g., traffic data or control data), quality of service (QoS) of the data to send, the amount of data to send, etc.

The terminal may receive the interference mitigation trigger from the serving base station and may send a reduce interference request at time $T_1$. The reduce interference request may also be referred to as a resource utilization message (RUM). The terminal may send the reduce interference request (i) as a unicast message to only base station(s) that are strong interferers to the terminal on the downlink or (ii) as a broadcast message to all neighbor base stations that can receive the request. The reduce interference request may ask the interfering base stations to reduce interference on specified resources and may also convey the priority of the request, a target interference level for the terminal, and/or other information.

An interfering base station may receive the reduce interference request from the terminal and may grant or dismiss the request. If the request is granted, then the interfering base station may adjust its transmit power and/or steer its transmission in order to reduce interference to the terminal. In one design, the interfering base station may determine a transmit power level $P_d$ that it will use on the specified resources based on various factors such as its buffer status, the priority of the request, the target interference level, etc. The interfering base station may transmit a power decision pilot at a power level of $P_{pdp}$ at time $T_2$. Pilot is a transmission that is known a priori by a transmitter station and a receiver station and may also be referred to as a reference signal, training, etc. A power decision pilot is a pilot having a variable transmit power level. $P_{pdp}$ may be equal to $P_d$ or may be a scaled version of $P_d$.

The terminal may receive power decision pilots from all interfering base stations as well as a pilot from the serving base station. The terminal may estimate SINR of the specified resources based on the received pilots. The power decision pilots may allow the terminal to more accurately estimate SINR. The terminal may determine channel quality indicator (CQI) information, which may comprise one or more SINR estimates, one or more modulation and coding schemes (MCSs), etc. The terminal may send the CQI information to the serving base station at time $T_3$.

The serving base station may receive the CQI information from the terminal and may schedule the terminal for data transmission on assigned resources, which may include all or a subset of the specified resources. The serving base station may select an MCS based on the CQI information and may process a data packet in accordance with the selected MCS. The serving base station may generate a downlink (DL) grant, which may also be referred to as a resource assignment. The downlink grant may include the assigned resources, the selected MCS, and/or other information. The serving base station may send the downlink grant and a packet transmission to the terminal at time $T_4$. The terminal may receive the downlink grant and the packet transmission, decode the received transmission in accordance with the selected MCS, and generate acknowledgement (ACK) information. The ACK information may indicate whether the packet is decoded correctly or in error by the terminal. The terminal may send the ACK information at time $T_5$.

The serving base station and the terminal may have common frame timing. The interference mitigation trigger, the reduce interference request, the CQI information, the data, and the ACK information may then be sent in specific subframes. For example, multiple (Q) interlaces may be defined for each link, with each interlace including subframes that are spaced apart by Q subframes. The serving base station may send its transmissions in subframes of one downlink interlace, and the terminal may send its transmissions in subframes of one uplink interlace.

The terminal and the interfering base station may have different frame timing due to asynchronous operation. The terminal may send the reduce interference request in a manner to enable reliable reception by the interfering base station, as described below. Similarly, the interfering base station may send the power decision pilot in a manner to enable proper reception by the terminal, as also described below.

Figure 5:
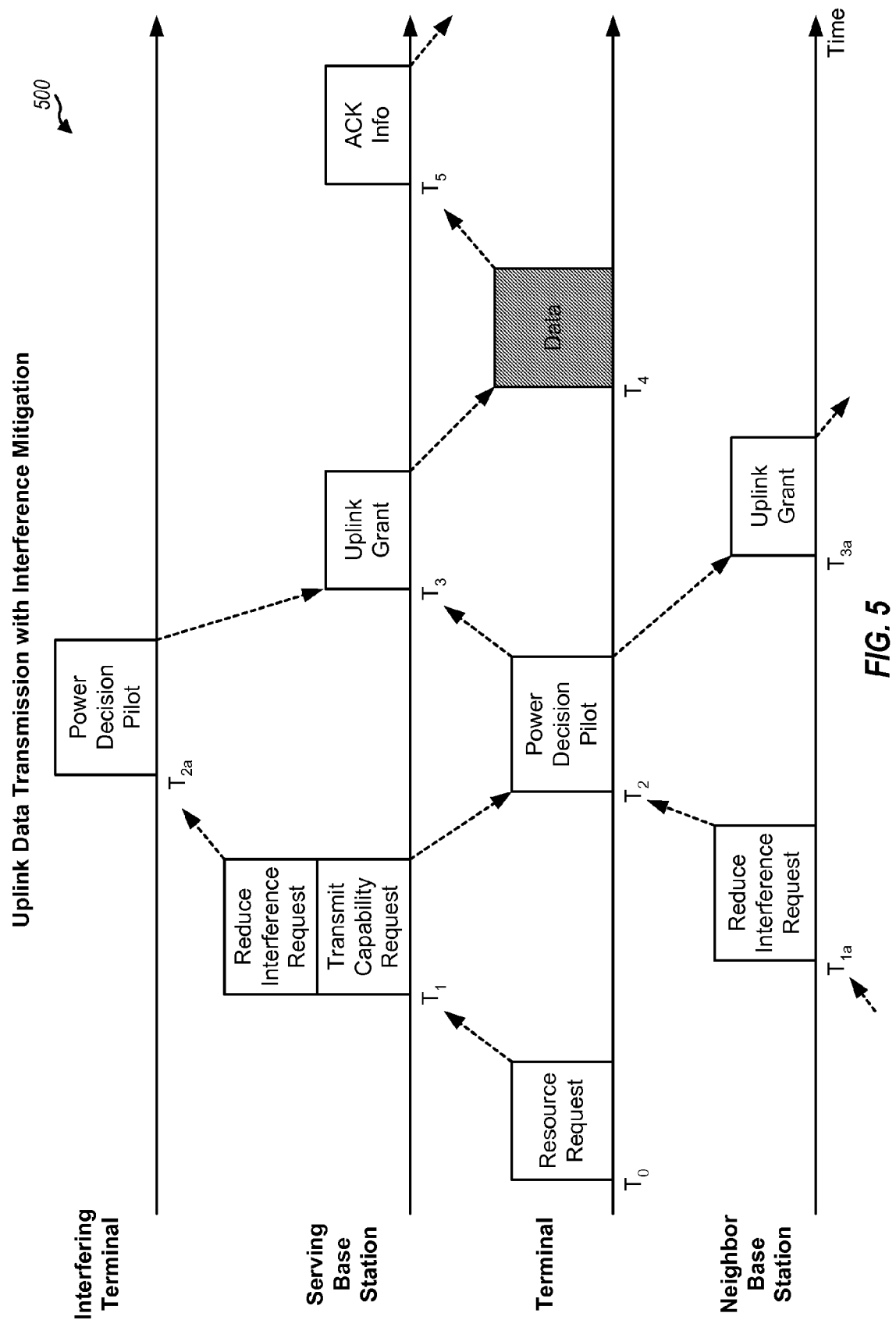
FIG. 5 shows uplink data transmission with interference mitigation.

FIG. 5 shows a design of an uplink data transmission scheme 500 with interference mitigation. A terminal may have data to send to a serving base station and may send a resource request at time $T_0$. The resource request may indicate the priority of the request, the amount of data to send by the terminal, etc. The serving base station may receive the resource request and may send a transmit capability request to the terminal at time $T_1$ to ask for the transmit capability of the terminal on specific resources. The serving base station may also send a reduce interference request at time $T_1$ to ask interfering terminals to reduce interference on the specific resources. For simplicity, only one interfering terminal is shown in FIG. 5.

The terminal may receive the transmit capability request from the serving base station and may also receive one or more reduce interference requests from one or more neighbor base stations. For simplicity, only one neighbor base station is shown in FIG. 5. The terminal may determine the transmit power level that it can use on the specified resources based on the reduce interference request from the neighbor base station. The terminal may convey this transmit power level via a power decision pilot sent at time $T_2$.

The serving base station may receive the power decision pilots from the terminal as well as the interfering terminal. The serving base station may estimate SINR of the specified resources based on the received pilots and may select an MCS for the terminal based on the estimated SINR. The serving base station may generate an uplink grant, which may include the selected MCS, assigned resources, the transmit power level to use for the assigned resources, and/or other information. The serving base station may send the uplink grant to the terminal at time $T_3$. The terminal may receive the uplink grant, process a packet in accordance with the selected MCS, and send a packet transmission on the assigned resources at time $T_4$. The serving base station may receive the packet transmission from the terminal, decode the received transmission, determine ACK information based on the decoding result, and send the ACK information at time $T_5$.

The serving base station and the terminal may have common frame timing. The resource request, the transmit capability request, the power decision pilot, the uplink grant, the data, and the ACK information may be sent in specific subframes. For example, the serving base station may send the transmit capability request, the uplink grant, and the ACK information in subframes of one downlink interlace, and the terminal may send the resource request, the power decision pilot, and the data in subframes of one uplink interlace.

The serving base station and the terminal may have different frame timing than that of the neighbor base station and the interfering terminal. Each base station may send reduce interference requests in a manner to enable reliable reception by interfering terminals, as described below. Similarly, each terminal may send power decision pilots in a manner to enable proper reception by base stations, as also described below.

In an aspect, some frequency resources may be reserved for an asynchronous control channel used to send reduce interference requests. The asynchronous control channel may also be referred to as an asynchronous RUM channel (RUMCH). The frequency resources reserved for sending reduce interference requests may also be referred to as reserved control resources.

In another aspect, some frequency resources may be reserved for an asynchronous pilot channel used to send power decision pilots. The asynchronous pilot channel may also be referred to as an asynchronous power decision pilot channel (PDPICH). The frequency resources reserved for sending power decision pilots may also be referred to as reserved pilot resources. The reserved control resources and the reserved pilot resources may be used to support interference mitigation in an asynchronous wireless network.

Figure 6:
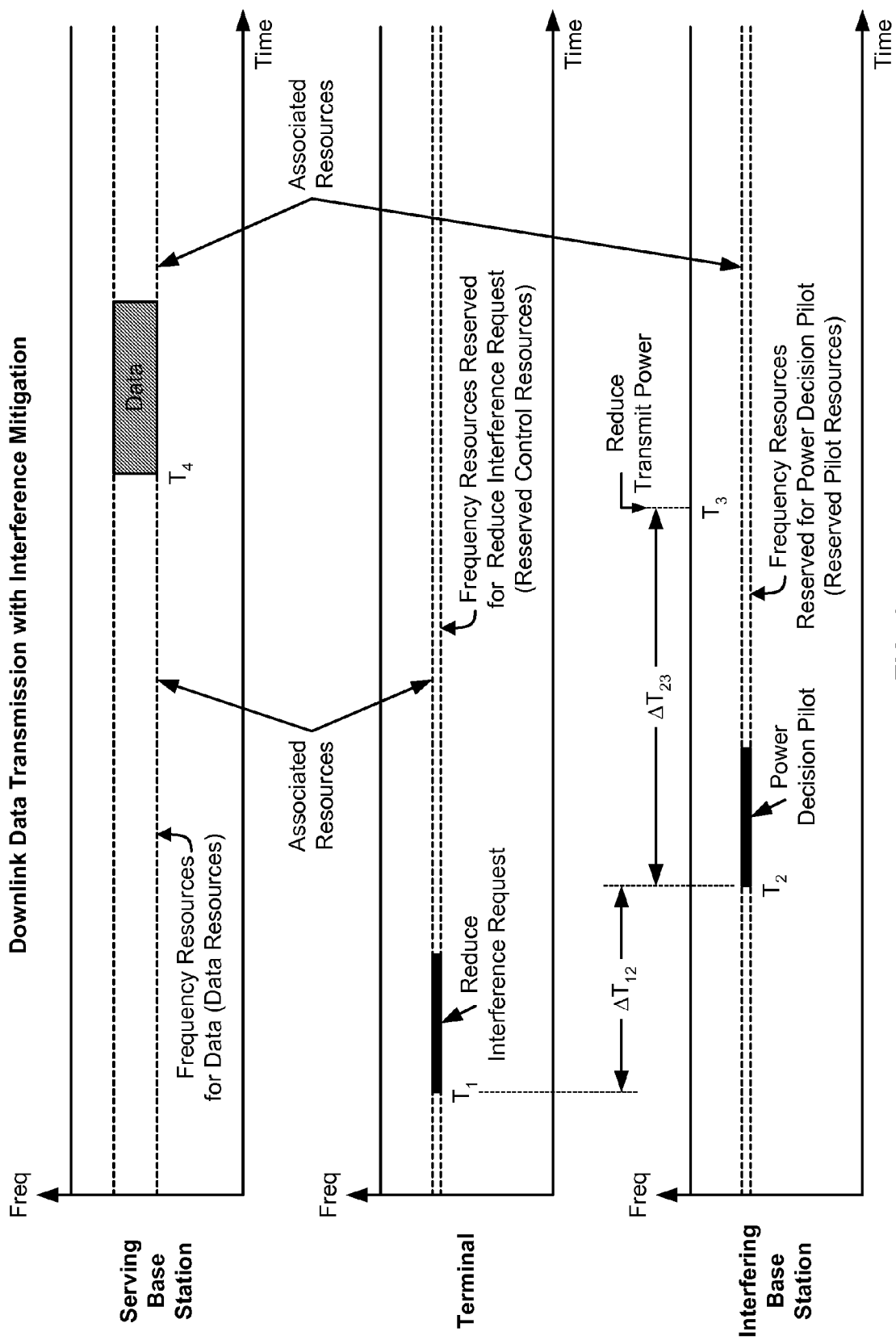
FIG. 6 shows downlink data transmission with interference mitigation using reserved control resources and reserved pilot resources.

FIG. 6 shows a design of data transmission on the downlink from a serving base station to a terminal with interference mitigation using reserved control resources and reserved pilot resources. In this design, frequency resources reserved for sending reduce interference requests by the terminal (or reserved control resources) may be associated with certain data resources at the serving base station. Frequency resources reserved for sending power decision pilots by an interfering base station (or reserved pilot resources) may also be associated with the data resources at the serving base station. The data resources may comprise frequency resources that can be used by the serving base station to send data on the downlink.

In one design, the data resources may comprise one or more subbands, one or more carriers, a set of subcarriers, etc. In one design, the reserved control resources may comprise a set of subcarriers for the uplink. In one design, the reserved pilot resources may comprise a set of subcarriers for the downlink. In one exemplary design, the data resources may comprise a 5 MHz carrier or four 1.08 MHz subbands, the reserved control resources may comprise a set of 16 subcarriers, and the reserved pilot resources may comprise a set of 16 subcarriers. Each subcarrier set may include contiguous subcarriers or subcarriers distributed across frequency. The data resources, the reserved control resources, and the reserved pilot resources may also comprise other types of resources. The reserved control resources and the reserved pilot resources may be available all the time, most of the time, only during certain time intervals, etc.

For data transmission on the downlink with interference mitigation, the terminal may send a reduce interference request on the reserved control resources at time $T_1$. The interfering base station may receive the reduce interference request on the reserved control resources and may be able to determine that the request is for interference reduction on the associated data resources. The interfering base station may determine its transmit power level $P_d$ for the data resources in response to receiving the reduce interference request. The interfering base station may then send a power decision pilot at a transmit power level of $P_{pdp}$ on the reserved pilot resources at time $T_2$. $P_{pdp}$ may be equal to $P_d$ or may be a scaled version of $P_d$. The interfering base station may reduce its transmit power to $P_d$ or lower on the data resources at time $T_3$. The serving base station may send data to the terminal at time $T_4$, which may occur at or later than time $T_3$.

The terminal may send the reduce interference request at time $T_1$, which may be determined based on the frame timing of the terminal. The interfering base station may have different frame timing and may thus continually detect for reduce interference requests on the reserved control resources. The interfering base station may send the power decision pilot at time $T_2$. In one design, the transmission time $T_2$ of the power decision pilot may be delayed by a fixed amount of $\Delta T_{12}$ from the transmission time $T_1$ of the reduce interference request. In another design, time $T_2$ may be determined based on the frame timing of the interfering base station and may be delayed by a variable amount from time $T_1$.

In one design, the time $T_3$ of transmit power reduction by the interfering base station may be delayed by (i) a fixed amount of $\Delta T_{23}$ from the transmission time $T_2$ of the power decision pilot, as shown in FIG. 6, or (ii) a fixed amount of $\Delta T_{13}$ from the transmission time $T_1$ of the reduce interference request. In another design, time $T_3$ may be delayed by a variable amount from time $T_1$ or $T_2$. The interfering base station may also honor the reduce interference request in an asynchronous manner. For example, the interfering base station may respond to the request after finishing its own transmission.

In one design, the interfering base station may send the power decision pilot and reduce its transmit power based on frame timing of the serving base station and the terminal. In this design, the serving base station may send data to the terminal based on their common frame timing. In another design, the serving base station and the terminal may send data based on the framing timing of the interfering base station, which may be ascertained from the power decision pilot. In yet another design, each station may operate based on its frame timing. For example, time $T_3$ may be the start of a subframe of the interfering base station, and time $T_4$ may be the start of a subframe of the serving base station. The difference between time $T_3$ and time $T_4$ may be dependent on the difference between the frame timing of the interfering base station and the frame timing of the serving base station. In all design, the interfering base station may reduce its transmit power for a sufficient duration, which may be known a priori by all stations, conveyed in the reduce interference request, conveyed in the power decision pilot, etc.

Figure 7:
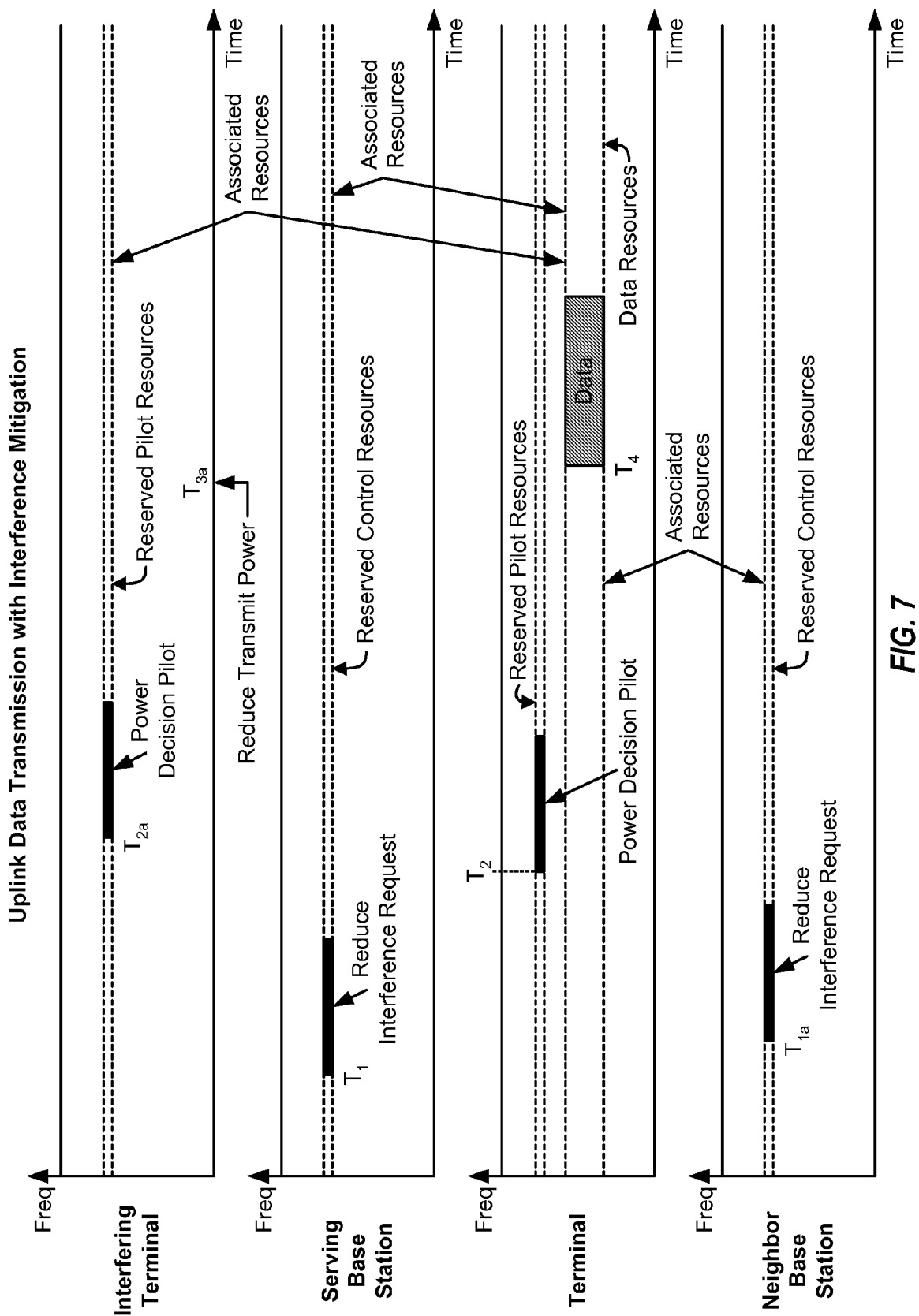
FIG. 7 shows uplink data transmission with interference mitigation using reserved control resources and reserved pilot resources.

FIG. 7 shows a design of data transmission on the uplink from a terminal to a serving base station with interference mitigation using reserved control resources and reserved pilot resources. In this design, frequency resources reserved for sending reduce interference requests by base stations (or reserved control resources) may be associated with certain data resources at the terminal. Frequency resources reserved for sending power decision pilots by terminals (or reserved pilot resources) may also be associated with the data resources at the terminal. The data resources may comprise frequency resources that can be used by the terminal to send data on the uplink.

In one design, the data resources may comprise one or more subbands, one or more carriers, a set of subcarriers, etc. In one design, the reserved control resources may comprise a set of subcarriers for the downlink. In one design, the reserved pilot resources may comprise a set of subcarriers for the uplink. Each subcarrier set may include contiguous subcarriers or subcarriers distributed across frequency. The data resources, the reserved control resources, and the reserved pilot resources may also comprise other types of resources. The reserved control resources and the reserved pilot resources may be available all the time, most of the time, only during certain time intervals, etc.

For data transmission on the uplink with interference mitigation, the serving base station and the interfering base station may send reduce interference requests on the reserved control resources at times $T_1$ and $T_{1a}$, respectively. The terminal may receive the reduce interference request from the interfering base station on the reserved control resources and may be able to determine that the request is for interference reduction on the associated data resources. The terminal may determine its transmit power level $P_{d1}$ for the data resources and may then send a power decision pilot at a transmit power level of $P_{pdp1}$ on the reserved pilot resources at time $T_2$. $P_{pdp1}$ may be equal to $P_{d1}$ or may be a scaled version of $P_{d1}$.

Similarly, the interfering terminal may receive the reduce interference request from the serving base station on the reserved control resources and may be able to determine that the request is for interference reduction on the associated data resources. The interfering terminal may determine its transmit power level $P_{d2}$ for the data resources and may then send a power decision pilot at a transmit power level of $P_{pdp2}$ on the reserved pilot resources at time $T_{2a}$. $P_{pdp2}$ may be equal to $P_{d2}$ or may be a scaled version of $P_{d2}$. The interfering terminal may thereafter reduce its transmit power to $P_{d2}$ or lower on the data resources at time $T_{3a}$.

The serving base station may receive the power decision pilots from the terminal and the interfering terminal at times $T_2$ and $T_{2a}$, respectively. The serving base station may estimate SINR of the data resources for the terminal, generate an uplink grant, and send the uplink grant to the terminal. The terminal may send data to the serving base station at time $T_4$, which may occur at or later than time $T_{3a}$.

The serving base station and the terminal may have the same frame timing, which may be different from the frame timing of the interfering base station and the interfering terminal. The transmission time $T_1$ of the reduce interference request from the serving base station, the transmission time $T_{2a}$ of the power decision pilot from the interfering terminal, and the time $T_{3a}$ of transmit power reduction by the interfering terminal may have fixed or variable offsets, as described above for FIG. 6. The transmission time $T_{1a}$ of the reduce interference request from the interfering base station, the transmission time $T_2$ of the power decision pilot from the terminal, and the time of transmit power reduction by the terminal may also have fixed or variable offsets.

A reduce interference request may be sent on reserved control resources in various manners. It may be desirable for a transmitter station to send a reduce interference request in a manner such that a receiver station can receive the request without having to perform multiple fast Fourier transforms (FFTs) corresponding to different possible transmitter frame timing. Various orthogonal designs may be used to allow the receiver station to receive the reduce interference request without knowledge of the frame timing of the transmitter station.

In a first orthogonal design, a transmitter station may send a reduce interference request on a selected subcarrier in a set of subcarriers reserved for sending reduce interference requests. The selected subcarrier may be determined in various manners. In one design, different subcarriers in the reserved set may be associated with different priorities. The selected subcarrier may then be the subcarrier in the reserved set associated with the priority of the reduce interference request. In another design, different cell or terminal identities (IDs) may be hashed to different subcarriers in the reserved set. The selected subcarrier may then be the subcarrier in the reserved set associated with the ID of a base station or a terminal sending the reduce interference request. In general, any information (e.g., priority, cell or terminal ID, etc.) for the reduce interference request may be hashed to different subcarriers in the reserved set. The selected subcarrier may then be determined based on the information for the reduce interference request. For example, a reduce interference request may comprise three bits for a cell ID or a terminal ID and one bit for priority of the request. The four total bits may be used to select one of 16 subcarriers in the reserved set. The selected subcarrier may also be determined in other manners. In any case, the transmitter station may send the reduce interference request on the selected subcarrier for a sufficient duration of time to enable reliable reception of the request.

In each symbol period, a receiver station may perform an FFT on time-domain samples and obtain frequency-domain received symbols for all K total subcarriers. The receiver station may determine the received power of each subcarrier in the reserved set based on the received symbols from that subcarrier. The receiver station may compare the received power of each subcarrier against a threshold to determine whether a reduce interference request has been received. The receiver station may also obtain information for the reduce interference request based on the specific subcarrier on which the request was detected.

In one design, the transmitter station may send a phase-continuous signal on the selected subcarrier. A phase-continuous signal is a signal having little or no phase discontinuity across consecutive symbol periods, so that the start of a waveform (e.g., a sinusoidal) for a given symbol period is a continuation of a waveform for a previous symbol period. The frame timing of the transmitter station may not be aligned with the frame timing of the receiver station. The receiver station may perform FFTs based on its frame timing. If the transmitter station sends a phase-continuous signal, then the receiver station may be able to avoid inter-carrier interference (ICI) and hence improve detection performance even if its FFT window is not time aligned with the symbol boundary of the transmitter station.

In a second orthogonal design, a transmitter station may send a reduce interference request via a beacon signal. A beacon signal is a signal in which information is conveyed in the specific subcarriers used for the signal instead of in modulation symbols sent on the subcarriers. A set of subcarriers may be reserved for sending the reduce interference request. The beacon signal may occupy one or few subcarriers in each beacon symbol period, which is a symbol period in which the beacon signal is sent. The transmitter station may generate a message comprising information for the reduce interference request, e.g., the priority of the request, the cell ID or terminal ID, etc. The transmitter station may encode the message with a beacon code to determine specific subcarrier(s) to use for the beacon signal in each beacon symbol period. The beacon code may be such that the reduce interference request can be detected by a receiver station without knowledge of the frame timing of the transmitter station. This may be achieved by ensuring that all shifts of a given codeword map to the same message.

To support asynchronous operation, the transmitter station may transmit on each selected subcarrier for N consecutive beacon symbol periods, where N may be greater than one. The transmitter station may also send a beacon preamble (e.g., a header or a prefix) prior to transmission of the body of the beacon signal. The beacon preamble may be a known sequence that may be used by receiver stations to detect the presence of the beacon signal. In any case, the transmitter station may send the beacon signal for the reduce interference request in a sufficient number of beacon symbol periods to enable reliable reception of the request.

The first and second orthogonal designs described above can gracefully handle collisions of reduce interference requests on the reserved set of subcarriers. For the first orthogonal design, if multiple transmitter stations send reduce interference requests on different subcarriers at or near the same time, then a receiver station can detect the reduce interference request from each transmitter station and can respond to each reduce interference request. If multiple transmitter stations send reduce interference requests on the same subcarrier at or near the same time, then the receiver station may receive duplicate reduce interference requests on the subcarrier and can respond to the duplicate reduce interference requests. For the second orthogonal design, the beacon code may be designed to allow the receiver station to detect beacon signals sent simultaneously by multiple transmitter stations.

In another design, a transmitter station may send a reduce interference request on all or most of the subcarriers in a reserved set. The transmitter station may generate a message comprising information for the reduce interference request, encode and modulate the message to obtain a set of modulation symbols, and send the modulation symbols on the subcarriers in the reserved set. The likelihood of collision of the reduce interference request may be sufficiently low if the reserved control resources are used infrequently. Collision may also be mitigated by having the transmitter station send the reduce interference request at pseudo-randomly selected time. The transmitter station may resend the reduce interference request if a prior request was unsuccessful.

In general, a transmitter station may send a reduce interference request on all or a subset of the reserved control resources. The transmitter station may send the reduce interference request in a manner to enable reliable detection of the request by a receiver station having different frame timing. The transmitter station may also send information with the reduce interference request in various manners, e.g., on a specific subcarrier selected based on a predetermined mapping, on different subcarriers determined based on a beacon code, in modulation symbols sent on the reserved subcarriers, etc.

A reduce interference request may be valid for a suitable duration, which may be fixed or configurable. In one design, a reduce interference request may be valid for a predetermined amount of time, which may be known a priori by a transmitter station and a receiver station, or may be conveyed in the request. In another design, a reduce interference request may be "sticky" and may be valid for an infinite amount of time, e.g., until another reduce interference request is sent. The receiver station may honor the reduce interference request in an asynchronous manner, e.g., may respond to the request after finishing its own transmission. If the transmitter station and the receiver station are asynchronous, then the interference level may vary substantially within a subframe. The reduce interference request may be valid for a number of subframes in order to avoid large intra-subframe interference variations.

It may be desirable to maintain the rate of sending reduce interference requests below a target level. Too many reduce interference requests per given time interval may cause significant intra-subframe interference variations due to asynchronous operation. Thus, it may be desirable to ensure that the average number of reduce interference requests per time interval is sufficiently small. This may be achieved in various manners. In one design, a station that receives too many reduce interference requests may trigger long-term interference mitigation to reserve some frequency resources for the station. In another design, the station may reduce the number of reduce interference requests it sends over time when it detects too many reduce interference requests. For example, the station may limit the rate of reduce interference requests to at most one request every 10 subframes.

A transmitter station may send a power decision pilot to allow a receiver station to more accurately estimate SINR, which may lead to better rate prediction and improved data performance. The transmitter station may send the power decision pilot on a reserved set of subcarriers in various manners. In one design, the transmitter station may generate pilot symbols based on a scrambling code assigned to the transmitter station and may send the pilot symbols on all subcarriers in the reserved set. In this design, different transmitter stations may be assigned different scrambling codes and may send their power decision pilots on the same set of subcarriers. In another design, the transmitter station may send the power decision pilot on a subset of subcarriers (e.g., one subcarrier) in the reserved set and may apply its scrambling code across time. In this design, different transmitter stations may send their power decision pilots on different subsets of subcarriers. In general, the transmitter station may apply its scrambling code across frequency and/or time for the power decision pilot. The transmitter station may also send the power decision pilot without any scrambling code. The transmitter station may send the power decision pilot on each subcarrier using a phase-continuous signal, as described above, to allow receiver stations to detect the pilot even in the absence of timing information.

In one design, a base station may send a power decision pilot all or most of the time and may vary the transmit power of the power decision pilot based on reduce interference requests received from terminals. In another design, a base station or a terminal may send a power decision pilot whenever reduce interference requests are received.

A transmitter station may send a power decision pilot at time $T_x$ and may reduce its transmit power at time $T_y$, where $T_x$ and $T_y$ may be determined as described above. A receiver station may use the power decision pilot to estimate the channel and interference conditions that it can expect at time $T_y$. The receiver station may determine CQI information based on the estimated channel and interference conditions and may report the CQI information to a serving base station, e.g., as shown in FIG. 4. Alternatively, the receiver station may use the estimated channel and interference conditions to select an MCS for data transmission, e.g., as shown in FIG. 5.

In one design, frequency-domain partitioning may be used between base stations. For example, a terminal may detect the presence of a weaker base station, e.g., based on a low reuse preamble sent by the base station. The weaker base station may negotiate with neighbor base stations (e.g., through messages sent via the backhaul) to reserve some frequency resources (e.g., one or more subbands) for use by the weaker base station to communicate with the terminal. The reserved frequency resources may be valid for an extended period of time (e.g., hundreds of milliseconds), which may be longer than the latency of the backhaul.

Figures 8, 9:
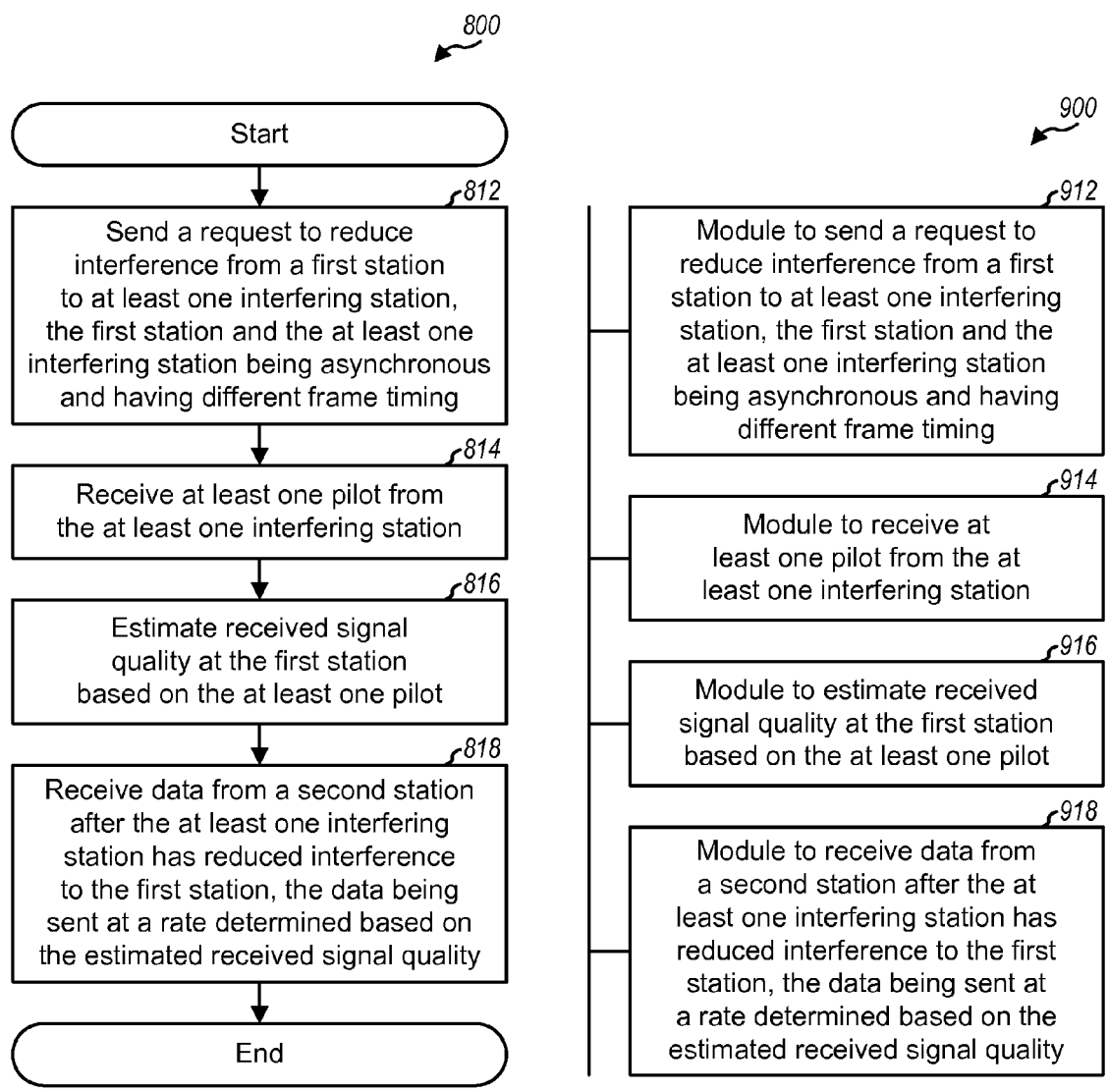
FIG. 8 shows a process for receiving data with interference mitigation.
FIG. 9 shows an apparatus for receiving data with interference mitigation.

FIG. 8 shows a design of a process 800 for receiving data with interference mitigation in a wireless network. Process 800 may be performed by a first station, which may be a terminal, a base station, or some other entity. The first station may send a request to reduce interference to at least one interfering station (block 812). The first station and the at least one interfering station may be asynchronous and may have different frame timing. The first station may receive at least one pilot sent by the at least one interfering station, e.g., in response to the request to reduce interference (block 814). The first station may estimate received signal quality based on the at least one pilot (block 816). The first station may receive data from a second station after the at least one interfering station has reduced interference to the first station (block 818). Each interfering station may reduce interference by reducing its transmit power and/or by beamsteering away from the first station. The data may be sent by the second station at a rate (e.g., in accordance with an MCS) determined based on the estimated received signal quality.

For data transmission on the downlink, the first station may be a terminal, the second station may be a serving base station, and each interfering station may be an interfering base station, e.g., as shown in FIG. 4. The terminal may receive a message to trigger interference mitigation from the serving base station and may send the request to reduce interference in response to receiving this message. For data transmission on the uplink, the first station may be a serving base station, the second station may be a terminal, and each interfering station may be an interfering terminal, e.g., as shown in FIG. 5. The serving base station may receive a resource request from the terminal and may send the request to reduce interference in response to receiving the resource request.

In one design, the first station may send the request to reduce interference on first frequency resources (or reserved control resources) reserved for sending the request to reduce interference. The first station may receive data on second frequency resources (or data resources) associated with the first frequency resources. The first station may receive the at least one pilot from the at least one interfering station on third frequency resources (or reserved pilot resources) associated with the second frequency resources. The first station may estimate received signal quality of the second frequency resources based on the at least one pilot.

In one design of block 812, the first station may determine a set of subcarriers reserved for sending the request to reduce interference. The first station may send the request to reduce interference on the set of subcarriers. In one design, the first station may select a subcarrier in the set of subcarriers based on information (e.g., the priority of the request, the identity of the first station, etc.) to send with the request to reduce interference. The first station may then send a signal (e.g., a phase-continuous signal) on the selected subcarrier to convey the request to reduce interference. In another design, the first station may select different subcarriers in the set of subcarriers in different symbol periods based on a beacon code and the information to send with the request to reduce interference. The first station may then send a beacon signal on the different subcarriers in different symbol periods to convey the request to reduce interference. The first station may also send the request to reduce interference in other manners.

FIG. 9 shows a design of an apparatus 900 for receiving data with interference mitigation in a wireless network. Apparatus 900 includes a module 912 to send a request to reduce interference from a first station to at least one interfering station, with the first station and the at least one interfering station being asynchronous and having different frame timing, a module 914 to receive at least one pilot from the at least one interfering station, a module 916 to estimate received signal quality at the first station based on the at least one pilot, and a module 918 to receive data from a second station after the at least one interfering station has reduced interference to the first station, with the data being sent at a rate determined based on the estimated received signal quality.

Figures 10, 11:
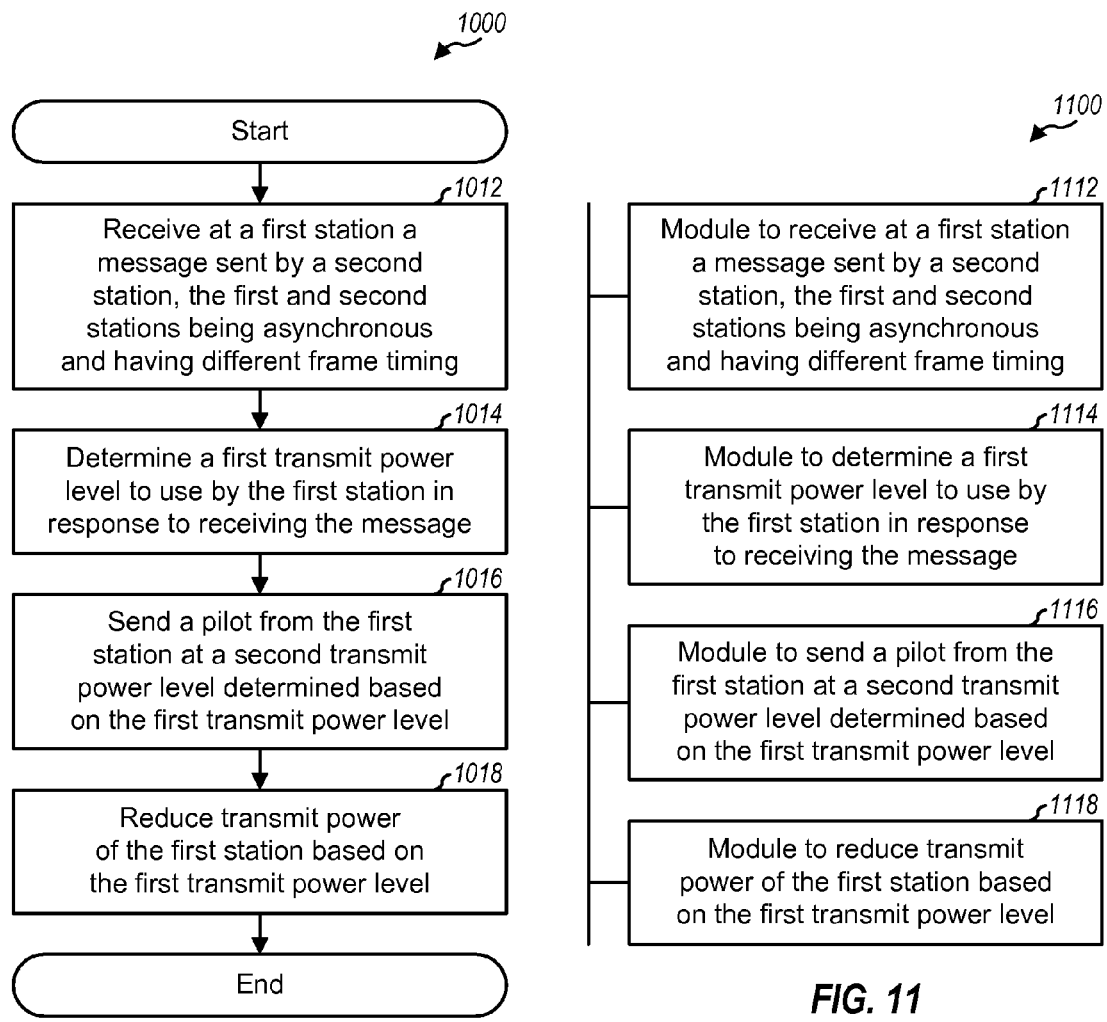
FIG. 10 shows a process for sending a power decision pilot.
FIG. 11 shows an apparatus for sending a power decision pilot.

FIG. 10 shows a design of a process 1000 for sending pilot in a wireless network. Process 1000 may be performed by a first station, which may be a terminal, a base station, or some other entity. The first station may receive a message from a second station (block 1012). The first and second stations may be asynchronous and may have different frame timing. The first station may determine a first transmit power level to use by the first station in response to receiving the message (block 1014). The first station may send a pilot at a second transmit power level determined based on the first transmit power level (block 1016). The first station may reduce its transmit power based on the first transmit power level (block 1018).

In one design, the first station may be a base station, and the second station may be a terminal. In another design, the first station may be a terminal, and the second station may be a base station. In one design, the message may comprise a request to reduce interference, e.g., as shown in FIG. 4 or 5. In another design, the message may comprise a request for transmit capability of the first station, e.g., as shown in FIG. 5.

In one design, the first station may receive the message on first frequency resources (or reserved control resources) reserved for sending the message and may determine the first transmit power level to use for second frequency resources (or data resources) associated with the first frequency resources. In one design, the first station may send the pilot on third frequency resources (or reserved pilot resources) associated with the second frequency resources. The first station may reduce its transmit power for the second frequency resources based on the first transmit power level.

In one design of block 1016, the first station may determine a set of subcarriers reserved for sending the pilot. In one design, the first station may select at least one subcarrier in the set of subcarriers and may send the pilot on the at least one subcarrier. In one design, the first station may generate pilot symbols based on a scrambling code assigned to the first station and may send the pilot symbols on the at least one subcarrier. In general, the first station may send the pilot on all or some of the subcarriers in the set of subcarriers. The first station may also applying the scrambling code across time and/or frequency or may send the pilot without scrambling.

FIG. 11 shows a design of an apparatus 1100 for sending pilot in a wireless network. Apparatus 1100 includes a module 1112 to receive at a first station a message sent by a second station, with the first and second stations being asynchronous and having different frame timing, a module 1114 to determine a first transmit power level to use by the first station in response to receiving the message, a module 1116 to send a pilot from the first station at a second transmit power level determined based on the first transmit power level, and a module 1118 to reduce transmit power of the first station based on the first transmit power level.

The modules in FIGS. 9 and 11 may comprise processors, electronics devices, hardware devices, electronics components, logical circuits, memories, software codes, firmware codes, etc., or any combination thereof.

Figure 12:
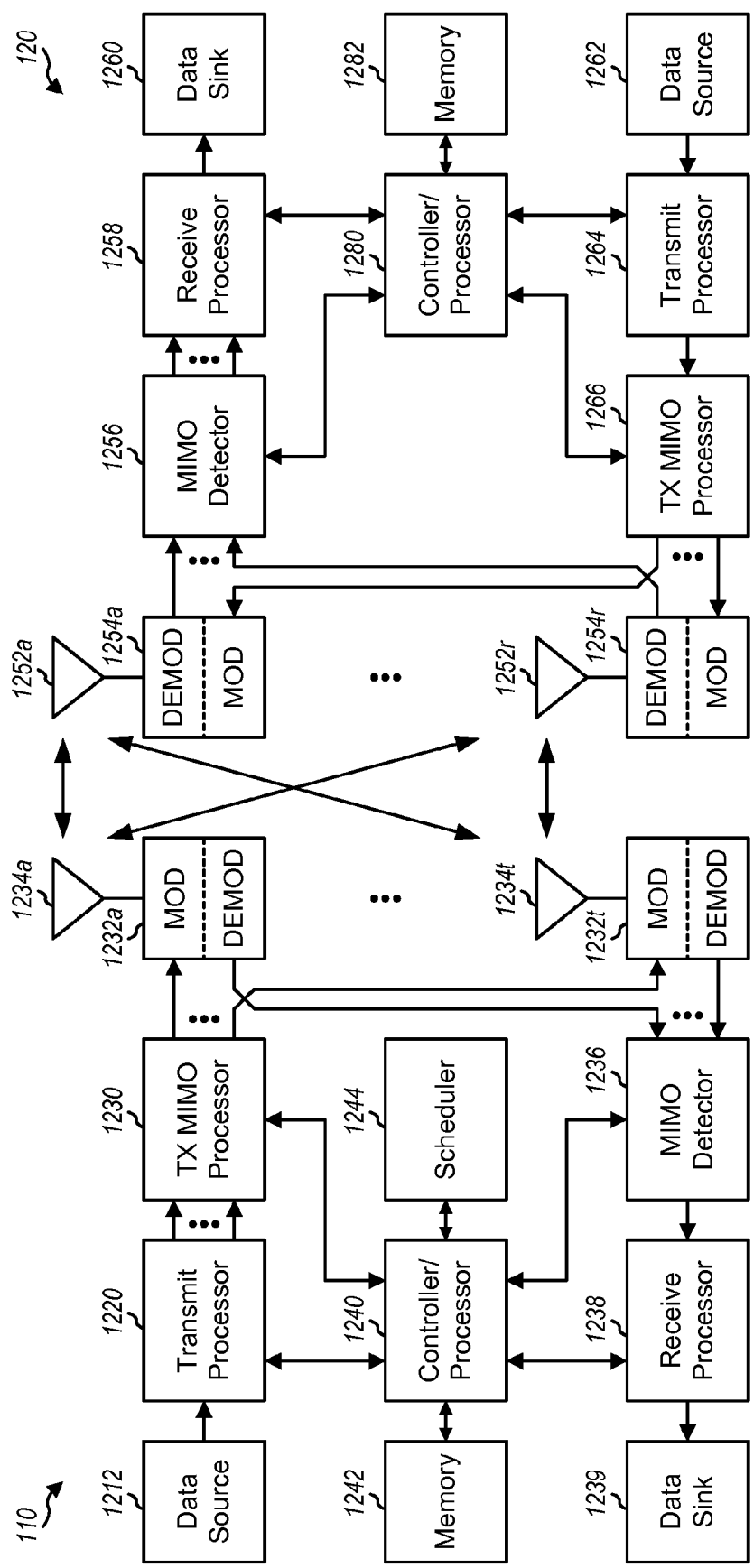
FIG. 12 shows a block diagram of a base station and a terminal.

FIG. 12 shows a block diagram of a design of a base station 110 and a terminal 120, which may be one of the base stations and one of the terminals in FIG. 1. Base station 110 may be equipped with T antennas 1234a through 1234t, and terminal 120 may be equipped with R antennas 1252a through 1252r, where in general T≥1 and R≥1.

At base station 110, a transmit processor 1220 may receive traffic data from a data source 1212 and messages from a controller/processor 1240. For example, controller/processor 1240 may provide messages for interference mitigation shown in FIGS. 4 through 7. Transmit processor 1220 may process (e.g., encode, interleave, and symbol map) the traffic data and messages and provide data symbols and control symbols, respectively. Transmit processor 1220 may also generate pilot symbols for a power decision pilot and/or other pilots or reference signals. A transmit (TX) multiple-input multiple-output (MIMO) processor 1230 may perform spatial processing (e.g., precoding) on the data symbols, the control symbols, and/or the pilot symbols, if applicable, and may provide T output symbol streams to T modulators (MODs) 1232a through 1232t. Each modulator 1232 may process a respective output symbol stream (e.g., for OFDM, SC-FDM, etc.) to obtain an output sample stream. Each modulator 1232 may further process (e.g., convert to analog, amplify, filter, and upconvert) the output sample stream to obtain a downlink signal. T downlink signals from modulators 1232a through 1232t may be transmitted via T antennas 1234a through 1234t, respectively.

At terminal 120, antennas 1252a through 1252r may receive the downlink signals from base station 110 and may provide received signals to demodulators (DEMODs) 1254a through 1254r, respectively. Each demodulator 1254 may condition (e.g., filter, amplify, downconvert, and digitize) a respective received signal to obtain input samples. Each demodulator 1254 may further process the input samples (e.g., for OFDM, SC-FDM, etc.) to obtain received symbols. A MIMO detector 1256 may obtain received symbols from all R demodulators 1254a through 1254r, perform MIMO detection on the received symbols if applicable, and provide detected symbols. A receive processor 1258 may process (e.g., demodulate, deinterleave, and decode) the detected symbols, provide decoded traffic data for terminal 120 to a data sink 1260, and provide decoded messages to a controller/processor 1280.

On the uplink, at terminal 120, a transmit processor 1264 may receive and process traffic data from a data source 1262 and messages (e.g., for resource requests, reduce interference requests, etc.) from controller/processor 1280. Transmit processor 1264 may also generate pilot symbols for a power decision pilot and/or other pilots or reference signals. The symbols from transmit processor 1264 may be precoded by a TX MIMO processor 1266 if applicable, further processed by modulators 1254a through 1254r, and transmitted to base station 110. At base station 110, the uplink signals from terminal 120 may be received by antennas 1234, processed by demodulators 1232, detected by a MIMO detector 1236 if applicable, and further processed by a receive processor 1238 to obtain the decoded packets and messages transmitted by terminal 120.

Controllers/processors 1240 and 1280 may direct the operation at base station 110 and terminal 120, respectively. Processor 1240 and/or other processors and modules at base station 110 may perform or direct process 800 in FIG. 8, process 1000 in FIG. 10, and/or other processes for the techniques described herein. Processor 1280 and/or other processors and modules at terminal 120 may also perform or direct process 800 in FIG. 8, process 1000 in FIG. 10, and/or other processes for the techniques described herein. Memories 1242 and 1282 may store data and program codes for base station 110 and terminal 120, respectively. A scheduler 1244 may schedule terminals for data transmission on the downlink and/or uplink and may provide resource grants for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   sending a request to reduce interference from a first station to at least one interfering station, the first station and the at least one interfering station being asynchronous and having different frame timing; and
   receiving data from a second station after the at least one interfering station has reduced interference to the first station.

2. The method of claim 1, further comprising:
   receiving an interference mitigation trigger from the second station, and wherein the request to reduce interference is sent in response to receiving the interference mitigation trigger.

3. The method of claim 1, further comprising:
   receiving a resource request from the second station, and wherein the request to reduce interference is sent in response to receiving the resource request.

4. The method of claim 1, wherein the sending the request to reduce interference comprises sending the request to reduce interference on first frequency resources reserved for sending the request to reduce interference.

5. The method of claim 4, wherein the receiving data comprises receiving data on second frequency resources associated with the first frequency resources.

6. The method of claim 5, further comprising:
   receiving at least one pilot sent by the at least one interfering station on third frequency resources associated with the second frequency resources; and
   estimating received signal quality of the second frequency resources based on the at least one pilot, wherein data is sent by the second station at a rate determined based on the estimated received signal quality.

7. The method of claim 1, wherein the sending the request to reduce interference comprises
   determining a set of subcarriers reserved for sending the request to reduce interference, and
   sending the request to reduce interference on the set of subcarriers.

8. The method of claim 1, wherein the sending the request to reduce interference comprises
   determining a set of subcarriers reserved for sending the request to reduce interference,
   selecting a subcarrier in the set of subcarriers based on information to send with the request to reduce interference, and
   sending a signal on the selected subcarrier to convey the request to reduce interference.

9. The method of claim 8, wherein the selecting a subcarrier in the set of subcarriers comprises selecting a subcarrier in the set of subcarriers based on at least one of a priority of the request and an identity of the first station.

10. The method of claim 8, wherein the signal sent on the selected subcarrier comprises a phase-continuous signal.

11. The method of claim 1, wherein the sending the request to reduce interference comprises
determining a set of subcarriers reserved for sending the request to reduce interference,
selecting different subcarriers in the set of subcarriers in different symbol periods based on a beacon code and information to send with the request to reduce interference, and
sending a beacon signal on the different subcarriers in different symbol periods to convey the request to reduce interference.

12. The method of claim 1, wherein the first station is a terminal, the second station is a serving base station, and the at least one interfering station is at least one interfering base station.

13. The method of claim 1, wherein the first station is a serving base station, the second station is a terminal, and the at least one interfering station is at least one interfering terminal.

14. An apparatus for wireless communication, comprising:
at least one processor configured to send a request to reduce interference from a first station to at least one interfering station, and to receive data from a second station after the at least one interfering station has reduced interference to the first station, the first station and the at least one interfering station being asynchronous and having different frame timing.

15. The apparatus of claim 14, wherein the at least one processor is configured to receive a resource request or an interference mitigation trigger from the second station, and to send the request to reduce interference in response to receiving the resource request or the interference mitigation trigger.

16. The apparatus of claim 14, wherein the at least one processor is configured to send the request to reduce interference on first frequency resources reserved for sending the request to reduce interference, and to receive data on second frequency resources associated with the first frequency resources.

17. The apparatus of claim 16, wherein the at least one processor is configured to receive at least one pilot sent by the at least one interfering station on third frequency resources associated with the second frequency resources, and to estimate received signal quality of the second frequency resources based on the at least one pilot, wherein data is sent by the second station at a rate determined based on the estimated received signal quality.

18. The apparatus of claim 14, wherein the at least one processor is configured to determine a set of subcarriers reserved for sending the request to reduce interference, and to send the request to reduce interference on the set of subcarriers.

19. An apparatus for wireless communication, comprising:
means for sending a request to reduce interference from a first station to at least one interfering station, the first station and the at least one interfering station being asynchronous and having different frame timing; and
means for receiving data from a second station after the at least one interfering station has reduced interference to the first station.

20. The apparatus of claim 19, further comprising:
means for receiving a resource request or an interference mitigation trigger from the second station, wherein the means for sending the request to reduce interference comprises means for sending the request to reduce interference in response to receiving the resource request or the interference mitigation trigger.

21. The apparatus of claim 19, wherein the means for sending the request to reduce interference comprises means for sending the request to reduce interference on first frequency resources reserved for sending the request to reduce interference, and wherein the means for receiving data comprises means for receiving data on second frequency resources associated with the first frequency resources.

22. The apparatus of claim 21, further comprising:
means for receiving at least one pilot sent by the at least one interfering station on third frequency resources associated with the second frequency resources; and
means for estimating received signal quality of the second frequency resources based on the at least one pilot, wherein data is sent by the second station at a rate determined based on the estimated received signal quality.

23. The apparatus of claim 19, wherein the means for sending the request to reduce interference comprises
means for determining a set of subcarriers reserved for sending the request to reduce interference, and
means for sending the request to reduce interference on the set of subcarriers.

24. A computer program product, comprising:
a non-transitory computer-readable medium comprising:
code for causing at least one computer to send a request to reduce interference from a first station to at least one interfering station, the first station and the at least one interfering station being asynchronous and having different frame timing, and
code for causing at least one computer to receive data from a second station after the at least one interfering station has reduced interference to the first station.

25. A method for wireless communication, comprising:
receiving at a first station a message sent by a second station, the first and second stations being asynchronous and having different frame timing;
determining a first transmit power level to use by the first station in response to receiving the message; and
sending a pilot from the first station at a second transmit power level determined based on the first transmit power level.

26. The method of claim 25, wherein the message comprises a request for transmit capability of the first station.

27. The method of claim 25, wherein the message comprises a request to reduce interference.

28. The method of claim 25, wherein the receiving the message comprises receiving the message on first frequency resources reserved for sending the message, and wherein the determining the first transmit power level comprises determining the first transmit power level to use for second frequency resources associated with the first frequency resources.

29. The method of claim 28, wherein the sending the pilot comprises sending the pilot on third frequency resources associated with the second frequency resources.

30. The method of claim 28, further comprising:
reducing transmit power of the first station on the second frequency resources based on the first transmit power level.

31. The method of claim 25, wherein the sending the pilot comprises
determining a set of subcarriers reserved for sending the pilot,
selecting at least one subcarrier in the set of subcarriers, and
sending the pilot on the at least one subcarrier.

32. The method of claim 31, wherein the sending the pilot on the at least one subcarrier comprises generating pilot symbols based on a scrambling code assigned to the first station, and sending the pilot symbols on the at least one subcarrier.

33. The method of claim 25, wherein the sending the pilot comprises sending the pilot by applying a scrambling code assigned to the first station across at least one of time and frequency.

34. An apparatus for wireless communication, comprising:

at least one processor configured to receive at a first station a message sent by a second station, the first and second stations being asynchronous and having different frame timing, to determine a first transmit power level to use by the first station in response to receiving the message, and to send a pilot from the first station at a second transmit power level determined based on the first transmit power level.

35. The apparatus of claim 34, wherein the message comprises a request for transmit capability of the first station or a request to reduce interference.

36. The apparatus of claim 34, wherein the at least one processor is configured to receive the message on first frequency resources reserved for sending the message, to determine the first transmit power level to use for second frequency resources associated with the first frequency resources, and to send the pilot on third frequency resources associated with the second frequency resources.

37. The apparatus of claim 34, wherein the at least one processor is configured to determine a set of subcarriers reserved for sending the pilot, to select at least one subcarrier in the set of subcarriers, and to send the pilot on the at least one subcarrier.

\* \* \* \* \*